(12) United States Patent
Smith, III

(10) Patent No.: US 6,179,002 B1
(45) Date of Patent: Jan. 30, 2001

(54) HYDRAULIC COUPLING WITH PRESSURE-ENERGIZED DOVETAIL SEAL

(75) Inventor: Robert E. Smith, III, Missouri City, TX (US)

(73) Assignee: National Coupling Company, Inc., Stafford, TX (US)

(*) Notice: Under 35 U.S.C. 154(b), the term of this patent shall be extended for 0 days.

(21) Appl. No.: 09/478,931

(22) Filed: Jan. 6, 2000

(51) Int. Cl.[7] .................................................. F16L 37/28
(52) U.S. Cl. ...................... 137/614.04; 285/108; 285/111; 285/917; 137/614
(58) Field of Search ........................ 137/614.04, 614; 251/149.7; 285/108, 917, 111

(56) References Cited

U.S. PATENT DOCUMENTS

| | | |
|---|---|---|
| 2,538,198 | 1/1951 | Hosford . |
| 2,736,585 | 2/1956 | Riesing . |
| 2,815,973 * | 12/1957 | Jackson ............................ 285/111 X |
| 2,884,268 | 4/1959 | Amirault et al. . |
| 2,977,143 | 3/1961 | Talamonti . |
| 3,013,826 | 12/1961 | Sharp . |
| 3,042,248 | 7/1962 | Krueger . |
| 3,279,806 | 10/1966 | Bialkowski . |
| 3,394,939 | 7/1968 | Mastro . |
| 3,511,513 | 5/1970 | Dahlheimer . |
| 3,671,048 | 6/1972 | Gyery . |
| 3,785,856 | 1/1974 | Gotoh . |
| 3,829,106 | 8/1974 | Wheelock . |
| 4,452,462 | 6/1984 | Karr, Jr. . |
| 4,635,945 | 1/1987 | Beck . |
| 4,694,859 | 9/1987 | Smith, III . |
| 4,709,726 | 12/1987 | Fitzgibbons . |
| 4,900,071 | 2/1990 | Smith, III . |
| 5,052,439 | 10/1991 | Smith, III . |
| 5,099,882 | 3/1992 | Smith, III . |
| 5,203,374 * | 4/1993 | Smith, III ........................ 137/614.04 |
| 5,232,021 | 8/1993 | Smith . |
| 5,556,139 | 9/1996 | Wilkins . |
| 5,762,106 | 6/1998 | Smith, III . |
| 5,979,499 | 11/1999 | Smith . |
| 5,983,934 | 11/1999 | Smith, III . |

* cited by examiner

*Primary Examiner*—Kevin Lee
(74) *Attorney, Agent, or Firm*—Fulbright & Jaworski

(57) ABSTRACT

An undersea hydraulic coupling having a radial pressure-energized seal with a dovetail interfit is disclosed. The seal has a pair of flexible sealing surfaces for sealing with the male and female coupling members, and a cavity therebetween that is exposed to fluid pressure in the coupling. The outer circumference of the seal has a dovetail interfit between inclined shoulders in the female member bore and on a seal retainer that holds the seal in the bore.

20 Claims, 3 Drawing Sheets

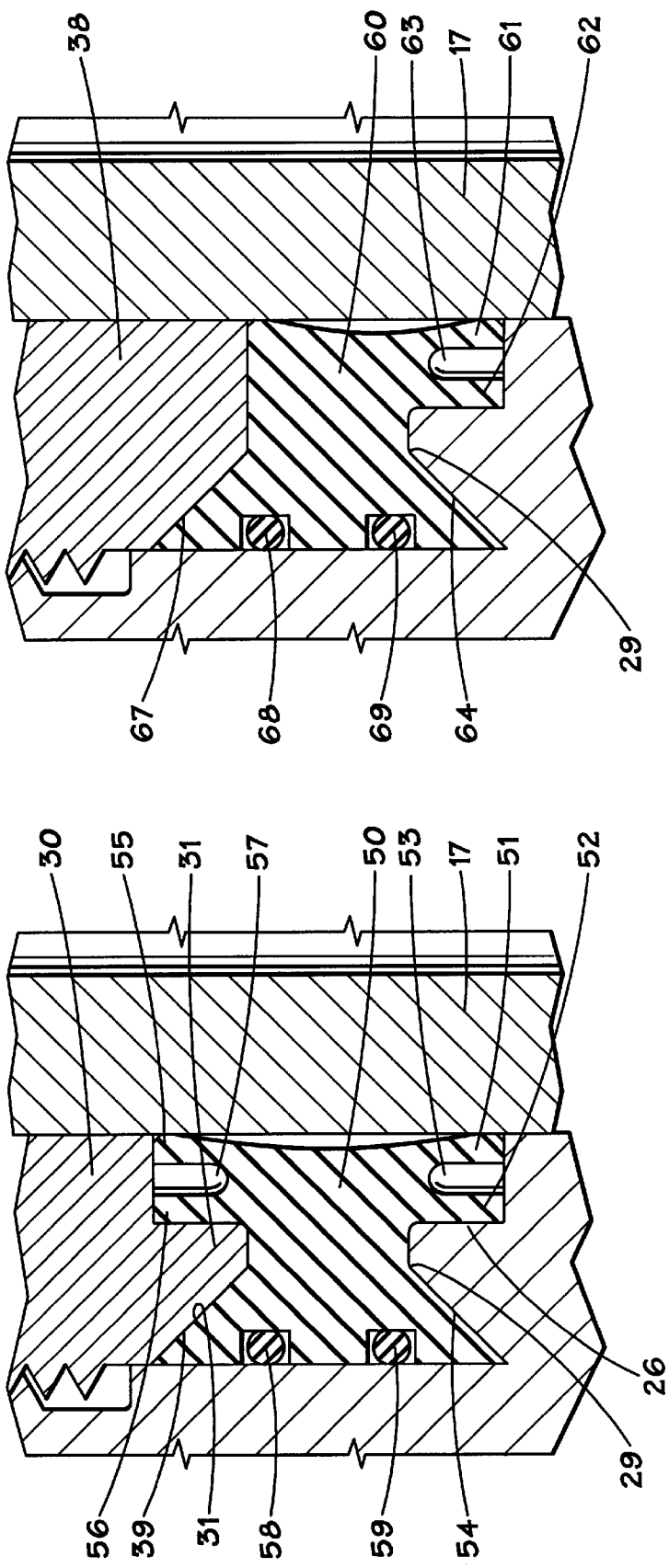

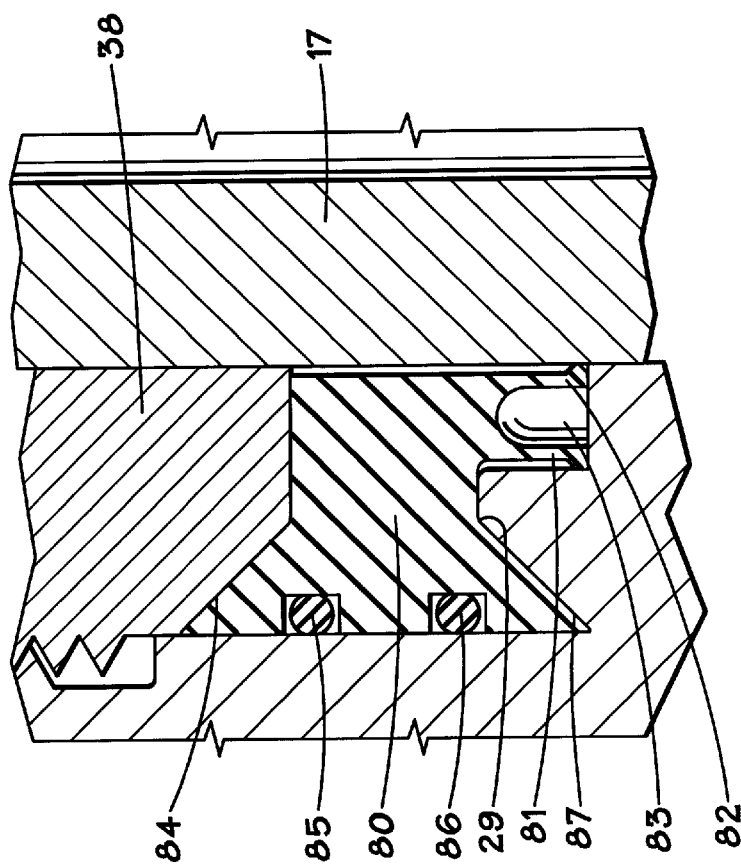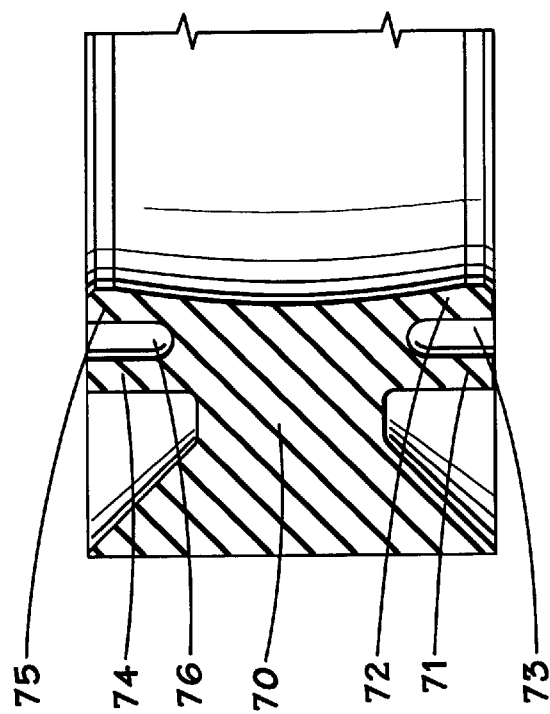

HYDRAULIC COUPLING WITH PRESSURE-ENERGIZED DOVETAIL SEAL

BACKGROUND OF THE INVENTION

1. Field of the Invention

This invention relates, in general, to hydraulic couplings, and specifically to hydraulic couplings used in undersea drilling and production applications. More particularly, the invention involves an undersea hydraulic coupling having an improved radial seal with a dovetail interfit for holding and positioning the seal in place upon separation of the male member from the female member of the coupling.

2. Description of the Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

A check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical body or retainer. When the male and female portions of the coupling are parted under pressure, the retainer prevents the metal seal from blowing out through the bore of the female member.

U.S. Pat. No. 4,900,071 to Robert E. Smith III discloses an undersea hydraulic coupling with a dovetail seal. A two-piece retainer restrains radial movement of a wedge-shaped annular seal into the central bore of the female member. The seal is restrained from radial movement by a dovetail interfit with a circumferential shoulder on at least one of the retainer sleeve and the retainer locking member. U.S. Pat. Nos. 5,052,439, 5,099,882, 5,203,374, 5,232,021 to Robert E. Smith III also show undersea hydraulic couplings with dovetail seals. The inner cylindrical surface of the annular seal engages the circumference of the male member or probe as the probe is inserted through the retainer into the female member. As the male member or probe is pulled out of the female member bore, the leading face of the male member reaches the soft annular seal intermediate that bore. When the face reaches the midpoint of the soft annular seal, the dovetail interfit prevents the seal being imploded into the bore, as the seawater and/or hydraulic fluid enter the bore at high pressure.

It is desirable to enhance the sealing effect of the dovetail seals of the foregoing type, especially at greater depths in subsea drilling and production applications. In the past, many hydraulic couplings included two or more seals to assure that hydraulic fluid would not leak from the coupling at higher pressures and greater subseas depths. While seals having a dovetail interfit prevent blowing out or implosion of the seal into the bore of the female member, the seal alone is insufficient in certain applications. It is desirable to enhance the seal especially in higher pressure hydraulic systems and at greater depths. For example, a second pressure-energized seal may be used to seal radially between the male and female members, to supplement the first dovetail seal. However, the use of two or more seals and the structural design of the hydraulic coupling for such seals increases in complexity and cost when two or more seals are employed. Accordingly, a coupling having a seal that is able to provide functional capabilities of a dovetail-shaped seal and a pressure-energized seal is needed.

SUMMARY OF THE INVENTION

The present invention overcomes the above mentioned problems and disadvantages by providing a coupling with a seal that is dimensioned to provide a dovetail interfit with the female member, and may be pressure energized to enhance the seal against the male and female members. The seal has a dovetail interfit with the body of the female member and seal retaining member to restrain the seal from implosion and/or radial movement into the central bore upon separation of the female member and male member. The inner cylindrical surface of the seal engages the circumference of the male member or probe as the probe is inserted through the retainer into the female member. The inner cylindrical surface of the seal includes a pressure-energized portion that engages the male member and the female member. Fluid pressure acts on the cavity between the adjoining leg or lip portions of the seal. At increased pressures, the hydraulic pressure acting on the cavity enhances the seal between the male and female members of the couplings.

BRIEF DESCRIPTION OF THE DRAWINGS

FIG. 2 is a section view of the seal according to the first embodiment.

FIG. 3 is a section view of the seal according to a second preferred embodiment.

FIG. 4 is a section view of the seal according to a third preferred embodiment.

FIG. 5 is a section view of the seal according to a fourth preferred embodiment.

DETAILED DESCRIPTION OF A PREFERRED EMBODIMENT

Figure 1:
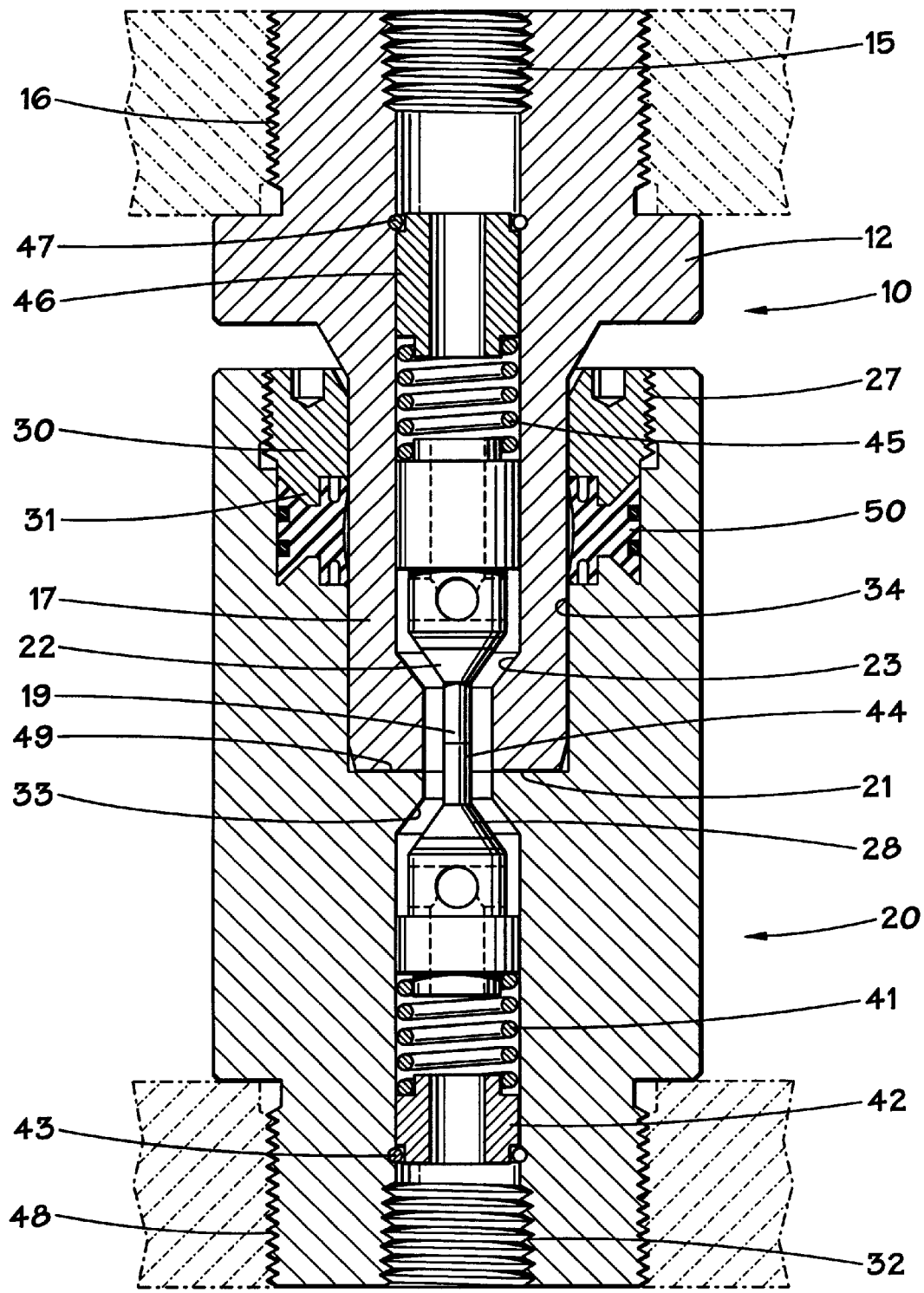
FIG. 1 is a section view of the male member and female member of the coupling when the coupling members are assembled together, according to a first preferred embodiment of the invention.

Undersea hydraulic couplings are generally connected to opposing plates of a manifold and are held together by bolts or hydraulic members attached to the plates. The male and female members may be attached to the opposing plates using various means, such as set screws or threads. Techniques for attaching members to such plates are well known to those skilled in the art.

As shown in FIG. 1, in a first preferred embodiment, the male member 10 comprises a threaded handle 16, which may be attached to a manifold plate. The handle terminates at flange 12 of the male member, which adjoins probe 17 and terminates at probe face 21. The cylindrical probe 17 is adapted for sliding engagement with the female member 20 and seal retainer 30 as will be described below. The body of the male member also is provided with a central bore 15. The bore 15 may have several variations in its diameter as it extends through the body of the male member. In a preferred embodiment, the first end of the central bore is an internally threaded section for connection to a hydraulic line. A cylindrical passageway extends longitudinally within the male member body and terminates at valve seat 23 which is an inclined shoulder.

A valve assembly is slidably received within the central bore 15 of the male member. The valve assembly comprises a conical poppet valve 22 which sealingly engages the valve seat 23 in its normally closed position. Helical valve spring 45 is used to urge the poppet valve into a closed position against the valve seat. The helical valve spring 45 is located within the cylindrical passageway 15 and is anchored at spring collar 46 which is held in place by collar clip 47 that is engaged within the inner surface of the cylindrical passageway of the male member. A valve actuator 19 extends from the apex of the poppet valve 17. When the poppet valve actuators of the male and female members engage, the valves are urged open to introduce the flow of hydraulic fluid between the male and female coupling members.

Female member 20 comprises a body having a central bore 32 which has several variations in its diameter as it extends through the female member. In a first preferred embodiment, the first end of the bore comprises an internally threaded section for connection to a hydraulic line. A cylindrical passageway extends longitudinally within the female member body and terminates at valve seat 33. Adjacent valve seat 33 is a shoulder 49 which is part of receiving chamber 34. The receiving chamber 34 is dimensioned to slidingly receive the probe section 17 of the male member.

The valve assembly of the female member comprises poppet valve 28 which is slidably received within the cylindrical passageway of the female member. Poppet valve 28 is conical in shape and is urged by valve spring 41 into a seated position against the valve seat 33. When the poppet valve is in a closed position against the valve seat, it seals fluid from flowing between the male member and the female member. Hollow spring collar 42 anchors the valve spring 41 and is held in place by collar clip 43. The female member preferably includes a handle 48 which may be threaded to a manifold plate.

In the first preferred embodiment shown in FIG. 1, the elastomeric seal 50 of the present invention is held in the female member by seal retainer 30. The seal retainer 30 preferably has a threaded outer circumference 27 that engages the female member. However, the retainer member may engage the female member by other means; for example, the retainer may be slidingly inserted into the female member and held in place with a clip or, alternatively, the retaining member may be dimensioned to engage the other surface of the female member rather than being inserted into the female member bore. Preferably, the retaining member 30 has a dovetail interfit with seal 50.

As shown in FIG. 2, seal 50 has an outer circumference with opposing inclined shoulders 39, 54. Inclined shoulders 39, 54 have a dovetail interfit with inclined shoulder 29 of the female member and inclined shoulder 31 of seal retainer 30. Optionally, the outer circumference of the dovetail seal 50 also includes O-rings 58, 59 which seal with the female member bore.

The inner radial circumference of seal 50, according to a first embodiment, includes a pair of opposing pressure energized sections for sealing engagement with the probe of the male member. Leg or lip section 51 engages the probe section while leg or lip section 52 of the seal engages the inner surface of projection 26 of the female member. Fluid pressure acting on cavity 53 urges the lip or leg sections 52 and 53 radially against the female and male members respectively to pressure energize the seal, especially at higher pressures. As the pressure acting on cavity 53 increases, the seal pressure is enhanced. Before engagement of the lip or leg section 51 with the male member probe section 17, the lip or leg section 51 may extend slightly radially into the bore to preload the seal with an interference fit against the probe section 17. Alternatively, the seal may rely entirely on pressure energization of the seal rather than preloading or interference fit with the probe.

Seal 50 also includes an opposing pair of lip or leg sections 55, 56, with an intermediate cavity 57. This portion of the seal is also pressure energized to urge the lip or leg sections 55 or 56 inwardly and outwardly to enhance the seal.

Now referring to FIG. 3 of the drawing, in a second preferred embodiment the elastomeric seal 60 has lip or leg sections 61, 62 with an intermediate cavity 63 that is pressure energized to enhance the seal by urging the lip or leg sections radially inwardly or outwardly. The outer circumference of seal 60 has a pair of inclined surfaces 64, 67 having a dovetail interfit with retainer 38 and inclined shoulder 29 of the female member. A pair of O rings 68, 69 also seal with the bore of the female member.

Now referring to FIG. 4 of the drawing, in a third preferred embodiment, elastomeric seal 70 includes a pair of lip or leg sections, 71, 72 with a pressure-energized expansible cavity 73 therebetween. Additionally, lip or leg sections 74, 75 have an intermediate cavity 76 that is pressure energized to enhance the seal against the probe section of the male member.

As shown in FIG. 5, according to a fourth preferred embodiment of the present invention, metal seal 80 has a dovetail interfit with the retainer 38 and inclined shoulder 29 in the female member bore. Inclined shoulder surfaces 84, 87 have a dovetail interfit with the inclined shoulder 29 of the female member and with the seal retaining member 38. The outer circumference of metal seal 80 includes O rings 85, 86 which seal with the female member bore. The inner circumference of seal 80 includes lip or leg sections 81, 82 with pressure-energized expansible cavity 83 therebetween. Cavity 83 is pressure energized to urge the lip or leg sections 81, 82 radially outwardly and inwardly to seal with the male member probe section and female member. The metal seal 80 may be configured to have a slight radial interference fit with the male member or probe, such that lip or leg section 82 extends slightly into the receiving chamber prior to engagement of the male member with the seal, thereby preloading the seal. Alternatively, seal 80 may be configured to require only hydraulic pressure acting on cavity 83 to provide the seal.

The dovetail seal of the present invention is wedge-shaped in cross-section at its outer circumference, having an outer cylindrical surface with greater axial thickness than its inner cylindrical surface to restrain the seal from radial movement into the female member bore when the coupling members are separated under pressure.

This seal may be made of any elastomer or metal, and preferably is made of such material that can withstand the deteriorating effect of the subsea environment. The seals may be made of a relatively pliable elastomeric material, for example, rubber or synthetic elastomer. Alternatively, the seal may be metal and gold or silver plated to enhance its metal to metal sealing, or have a non-metallic plating such as teflon. Seals as used in this invention are reusable because they are retained in place upon separation of the male and female members of the coupling.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling, comprising:
   (a) a male member having an internal bore and a valve for controlling fluid flow through the bore;
   (b) a female member having an internal bore, a valve for controlling fluid flow through the bore, and a receiving chamber for insertion of the male member therein; the receiving chamber having an inclined shoulder;
   (c) a ring-shaped seal insertable into the receiving chamber, the seal having an inner radial surface with a first leg section engaging the male member when the male member is inserted through the ring-shaped seal, and a second leg section engaging the receiving chamber, a cavity between the first and second leg sections, the cavity being responsive to fluid pressure to urge the first leg section radially inwardly and the second leg section radially outwardly, and
   (d) a seal retainer engageable to the female member, the seal retainer having an inclined shoulder, the ring-shaped seal having a dovetail interfit between the inclined shoulders of the receiving chamber and the seal retainer.

2. The undersea hydraulic coupling of claim 1, wherein the ring-shaped seal has a third leg section engaging the male member when the male member is inserted through the ring-shaped seal, and a fourth leg section engaging the receiving chamber, and a cavity between the third and fourth leg sections, the cavity being responsive to fluid pressure to urge the third section radially inwardly and the fourth section radially outwardly.

3. The undersea hydraulic coupling of claim 1 wherein the ring-shaped seal is an elastomeric seal.

4. The undersea hydraulic coupling of claim 1 wherein the ring-shaped seal is a metal seal.

5. The undersea hydraulic coupling of claim 1 wherein the seal retainer is threaded to the female member.

6. The undersea hydraulic coupling of claim 1 wherein the first leg section of the ring-shaped seal extends radially inwardly into the receiving chamber before the male member is inserted therethrough.

7. A female member of an undersea hydraulic coupling, comprising:
   (a) a body member with an internal bore extending therethrough, the internal bore having a receiving chamber adjacent a first end thereof, the receiving chamber having an inclined circumferential shoulder;
   (b) a radial pressure-energized seal insertable into the receiving chamber and having a dovetail interfit with the circumferential shoulder to restrain the seal from movement into the receiving chamber, the seal having at least one flexible sealing surface facing radially inwardly and at least one flexible sealing surface facing radially outwardly, and a cavity between the flexible sealing surfaces, the cavity being expansible in response to fluid pressure in the coupling; and
   (c) a seal retainer engageable with the body member, the seal having an inclined circumferential shoulder, the seal having a dovetail interfit with the inclined circumferential shoulder of the seal retainer and the inclined circumferential shoulder of the receiving chamber.

8. The female member of an undersea hydraulic coupling of claim 7, further comprising a pair of flexible sealing surfaces facing radially outwardly.

9. The female member of an undersea hydraulic coupling of claim 7, further comprising a pair of flexible sealing surfaces facing radially inwardly.

10. The female member of an undersea hydraulic coupling of claim 7, wherein the seal is composed of elastomeric material.

11. The female member of an undersea hydraulic coupling of claim 7, wherein the seal is composed of metallic material.

12. The female member of an undersea hydraulic coupling of claim 7, wherein the seal has an outer circumferential surface with a wedge-shaped cross-section.

13. An undersea hydraulic coupling comprising:
    (a) a female member having an internal bore with a shoulder intermediate the bore, the shoulder having an inclined surface;
    (b) a male member insertable into the internal bore;
    (c) a seal retainer engageable with the female member adjacent the shoulder, the seal retainer having a face with an inclined shoulder; and
    (d) a ring-shaped seal positionable between the inclined shoulder of the seal retainer and the inclined surface in the bore of the female member, the ring-shaped seal having a wedge-shaped outer circumference to engage the inclined shoulder of the seal retainer and the shoulder in the bore of the female member in a dovetail interfit, the seal having an inner circumference that is pressure energized to form a fluid-tight seal between the male member and female member bore.

14. The undersea hydraulic coupling of claim 13 wherein the ring-shaped seal includes at least two flexible sealing surfaces at the seal's inner circumference.

15. The undersea hydraulic coupling of claim 13 wherein the seal retainer is threaded to the female member.

16. The undersea hydraulic coupling of claim 13 wherein the male and female members have normally closed poppet valves.

17. The undersea hydraulic coupling of claim 13 wherein the ring-shaped seal is elastomeric.

18. The undersea hydraulic coupling of claim 13 wherein the ring-shaped seal is metal.

19. The undersea hydraulic coupling of claim 13 wherein the inner circumference of the ring-shaped seal is dimensioned to have an interference fit with the male member.

20. The undersea hydraulic coupling of claim 13 wherein the ring-shaped seal includes a pair of pressure-energized cavities.

* * * * *